United States Patent Office 3,840,548
Patented Oct. 8, 1974

3,840,548
THIAZOLYLBENZOIC ACID COMPOUNDS
Charles Malen, Fresnes, and Pierre Desnoyers, Fontenay-Aux-Roses, France, assignors to Societe en nom Collectif "Science Union et Cie Societe Francaise de Recherche Medicale," Suresnes, France
No Drawing. Filed June 3, 1971, Ser. No. 149,806
Claims priority, application Great Britain, June 12, 1970, 28,639/70
Int. Cl. C07d 91/32
U.S. Cl. 260—302 R         5 Claims

ABSTRACT OF THE DISCLOSURE

Thiazolylbenzoic acid compounds of the formula

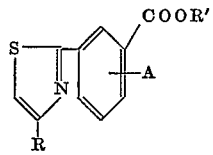

wherein A is hydrogen, halogen, lowe ralkyl or lower alkoxy, R is hydrogen, lower alkyl, phenyl, halophenyl, lower alkylphenyl or lower alkoxyphenyl and R' is hydrogen or lower alkyl.

These compounds possess fibrinolytic, thrombolytic, platelet adhesiveness and aggregation-decreasing properties.

The present invention provides a compound of thiazolylbenzoic acid of the general formula

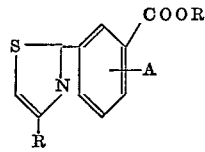

wherein:
A is selected from the group consisting of hydrogen and halogen atoms, and lower alkyl and lower alkoxy radicals each containing from 1 to 5 carbon atoms inclusive;
R is selected from the group consisting of a hydrogen atom, lower linear and branched alkyl radicals containing from 1 to 5 carbon atoms inclusive, and phenyl radicals unsubstituted and substituted by one or more halogen atoms, lower alkyl radicals and lower alkoxy radicals each containing from 1 to 5 carbon atoms inclusive; and
R' is selected from the group consisting of a hydrogen atom and lower alkyl radicals containing from 1 to 5 carbon atoms inclusive.

The compounds of the present invention are new and may be prepared by treating a nitrile of the general formula

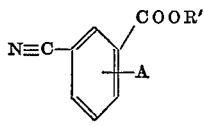

in which A and R' have the meanings defined above, with a current of hydrogen sulfide and reacting the resulting thioamide of the general formula

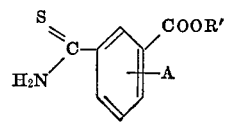

in which A and R' have the meanings defined above, with an α-halogenoketone of the general formula $$R—CO—CH_2—X \qquad IV$$

in which R has the meaning given above and X represents a chlorine or bromine atom.

The nitriles of the general formula II are known compounds. The conversion into a thioamide of the general formula III is achieved using hydrogen sulfide, the reaction preferably being carried out in pyridine and triethylamine. The cyclization of the thioamide using an α-halogenoketone of the formula IV is preferably carried out in a suitable solvent, for example methylcellosolve.

The compounds of the general formula I, wherein R' is hydrogen, are well-crystallized solids capable of forming more or less water-soluble salts with strong mineral or organic bases, for example alkali metal hydroxides or secondary or tertiary amines, for example di- and triethylamines. These salts are also included in the present invention.

The following examples illustrate the invention. The melting points were determined using a Kofler heater under a microscope (M.K.) or a Kofler block (K.B.).

EXAMPLE 1

Methyl 5-(4-methyl-2-thiazolyl)-2-methoxy-benzoate

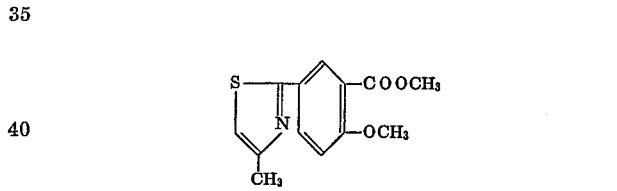

A mixture of 5 g. of methyl 5-cyano-2-methoxy-benzoate, 13 ml. of pyridine and 3.6 ml. of triethylamine was saturated for 2 hours with a current of hydrogen sulfide while excluding moisture. The mixture was then kept for 48 hours at room temperature and then evaporated to dryness. The residue was taken up in water, filtered, washed with water and dried, to yield 5 g. of methyl 5-thiocarboxamido-2-methoxy-benzoate melting at 218–222° C. (K.B.).

0.94 g. of monochloroacetone was added to a mixture of 2.2 g. of methyl 5-thiocarboxamido-2-methoxy-benzoate and 6.5 ml. of dry methylcellosolve and the whole was placed on a boiling waterbath. On completion of the addition the whole was kept for 1 hour at 100° C., then diluted with water and extracted with benzene. The benzene phase was washed with water, dried and evaporated to yield 1.7 g. of crude methyl 5-(4-methyl-2-thiazolyl)-2-methoxy-benzoate melting at 96–102° C. (K.B.) which after recrystallization from cyclohexanone furnished 1.4 g. of pure product melting at 95–100° C. (M.K.).

EXAMPLE 2

3-(4-para-chlorophenyl-2-thiazolyl)-benzoic acid

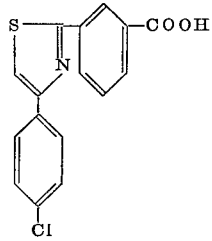

25 g. of 3-cyano-benzoic acid in 85 ml. of pyridine and 24 ml. of triethylamine were saturated with a current of hydrogen sulfide over a period of 2 hours. The mixture was then kept at room temperature for 24 hours and evaporated to dryness. The residue was taken up in water and the suspension acidified to a pH value of 3 and then filtered by suction, to yield 23.4 g. of 3-thiocarboxamido-benzoic acid melting at 248–252° C. (K.B.) which, after recrystallization from a mixture of methylcellosolve and water, melted at 248–250° C. (M.K.).

2 g. of the crude 3-thiocarboxamido-benzoic acid thus obtained in 10 ml. of methylcellosolve were treated with 2.5 g. of para-chloro-α-bromoacetophenone for 2 hours on a boiling waterbath. The reaction mixture was then diluted with 50 ml. of cold water, the product suctioned off, washed with water until the washings ran neutral, and dried, to yield 3 g. of 3-(4-para-chlorophenyl-2-thiazolyl)-benzoic acid melting at 250–260° C. (K.B.) and after recrystallization from diglyme melted at 260–262° C. (M.K.).

EXAMPLES 3 TO 11

The following derivatives were manufactured as described in Example 2 above:

3. 5-(4-methyl-2-thiazolyl)-2-methoxy-benzoic acid melting at 170–172° C. (M.K.) (ethanol), prepared from monochloroacetone and 5-thiocarboxamido-2-methoxy benzoic acid, which itself was obtained from 5-cyano-2-methoxybenzoic acid and hydrogen sulfide.
4. 5-(2-thiazolyl)-2-methoxy-benzoic acid melting at 199–203° C. (K.B.), prepared from chloroacetaldehyde and 5 thiacarboxamido-2-methoxy-benzoic acid, which itself was obtained from 5-cyano-2-methoxy-benzoic acid and hydrogen sulfide.
5. 5-(4-phenyl-2-thiazolyl)-2-methoxy-benzoic acid melting at 141–143° C. (K.B.), prepared from α-bromoacetophenone and 5-thiocarboxamido-2-methoxy-benzoic acid, which itself was obtained from 5-cyano-2-methoxy-benzoic acid and hydrogen sulfide.
6. 4-methyl-3-(4-methyl-2-thiazolyl)-benzoic acid melting at 180–181° C. (M.K.), prepared from monochloroacetone and 4-methyl-3-thiocarboxamido-benzoic acid melting at 200–215° C. (K.B.), which itself was obtained from 4-methyl-3-cyano-benzoic acid and hydrogen sulfide.
7. 3-(4-methyl-2-thiazolyl)benzoic acid melting at 190–193° C. (M.K.), prepared from monochloroacetone and 3-thiacarboxamido-benzoic acid melting at 235–240° C., which itself was obtained from 3-cyano-benzoic acid and hydrogen sulfide.
8. 5-(4-methyl-2-thiazolyl)-2-chloro-benzoic acid melting at 218–221° C. (M.K.) with sublimation, prepared from monochloroacetone and 5-thiocarboxamido-2-chloro-benzoic acid, which itself was obtained from 5-cyano-2-chloro-benzoic acid and hydrogen sulfide.
9. 5-(4-isobutyl-2-thiazolyl)-2-ethoxy-benzoic acid, prepared from chloromethyl isobutyl ketone and 5-thiocarboxamido-2-ethoxy-benzoic acid, which itself was obtained from 5-cyano-2-ethoxy-benzoic acid and hydrogen sulfide.
10. 5-(4-para-methylphenyl-2-thiazolyl)-2-propyl-benzoic acid, prepared from para-methyl-α-bromoacetophenone and 5-thiocarboxamido-2-propyl-benzoic acid, which itself was obtained from 5-cyano-2-propyl-benzoic acid and hydrogen sulfide.
11. 4-methoxy-3-(4-para-methoxyphenyl - 2 - thiazolyl)-benzoic acid, prepared from para-methoxy-α-bromoacetophenone and 4-methoxy-3-thiacarboxamido-benzoic acid, which itself was obtained from 4-methoxy-3-cyano-benzoic acid and hydrogen sulfide.

The new compounds of the general formula I and their physiologically tolerable salts possess valuable pharmacological and therapeutic properties, especially fibrinolytic, thrombolytic and platelet adhesiveness and aggregation-decreasing properties.

Their toxicity is very weak. The $LD_{50}$ in mice varies from 150 mg./kg. to >300 mg./kg. by intravenous route and from 1,000 mg./kg. to >3,000 mg./kg. by oral route.

The fibrinolytic activity was studied by the method described by Von Kaulla in Am. J. Clin. Path. 29, 104 (1958). It was found that 50 to 100 mg./kg. of the new compounds administered orally to the rat, decrease the englobulin lysis time from 10 to 56% after 30 to 90 minutes.

The thrombolytic activity was evidenced by the standard blood clot's lysis in vitro (Thromb. Diath. Haem. 5, 489, 1961). The lysis of the blood clot was observed at 0.05 to 0.03 molar concentration, corresponding to 11.65 to 6.99 mg./ml.

The activity on the platelet stickiness was demonstrated by the method of E. W. Salzman (J. Lab. Clin. Med. 62, 724, 1923). It was found that the new compounds, administered to the rabbit at 100 mg./kg. orally, decrease the platelet adhesiveness by 20 to 30% in 3 hours.

The effect of the new compounds on the platelet aggregation was studied by the photometric technique of Born and O'Brien, modified by Sinakos and Caen (Rev. Fr. Et. Clin. Biol. 11, 538, 1966). A concentration of 1,000 to 2,000 γ/ml. of the compounds inhibits up to 80% the platelet aggregation provoked by thrombine or adenosinediphosphate in the rat and rabbit plasma.

The here-above described pharmacological properties and the low toxicity allow the use of the new compounds in therapy, especially in the treatment and prevention of thrombosis, thromboembolic diseases, myocardial infarctus and arteriosclerosis.

The present invention also provides pharmaceutical compositions containing a compound of the general formula I or a physiologically tolerable salt thereof in admixture or conjunction with a suitable pharmaceutical carrier, such, for example, as distilled water, glucose, lactose, talc, starch, magnesium stearate and cocoa butter. These pharmaceutical compositions may be in form of tablets, dragees, capsules, suppositories or solutions in order to be administered by oral, rectal or parenteral route at doses of 10 to 500 mg., preferably 50 to 200 mg., 1 to 5 times a day.

The following example illustrates such a pharmaceutical preparation:

EXAMPLE 12

| | Mg. |
|---|---|
| 4-methyl-3-(4-methyl-2-thiazolyl)-benzoic acid. | 75 |
| Lactose | 120 |
| Starch | 60 |
| Talc | 20 |
| Magnesium Stearate | 3 | for 1 tablet to be drageified.

What we claim is:
1. A compound selected from the group consisting of
   (a) methyl 5-(4-methyl - 2 - thiazolyl)-2-methoxybenzoate,
   (b) 3-(4-para-chlorophenyl-2-thiazolyl) - benzoic acid, 5-(4-methyl-2-thiazolyl)-2-methoxy - benzoic acid, 5-(2-thiazolyl)-2-methoxy-benzoic acid, 5-(4-phenyl-2-thiazolyl)-2-methoxy-benzoic acid, 4-methyl-3-(4-methyl-2-thiazolyl)-benzoic acid, 5-(4-methyl-2-thia- zolyl)-2-chloro - benzoic acid, 5-(4-isobutyl-2-thiazolyl)-2-ethoxy-benzoic acid, 5-(4-para-methylphenyl-2-thiazolyl)-2-propylbenzoic acid, 4 - methoxy-3-(4-para - methoxyphenyl-2-thiazolyl) benzoic acid, and (c) physiologically tolerable salts of the compounds of group (b).

2. A compound of claim 1 which is methyl 5-(4-methyl-2-thiazolyl)-2-methoxy-benzoate.

3. A compound of claim 1 which is 3-(4-para-chlorophenyl-2-thiazolyl)-benzoic acid.

4. A compound of claim 1 which is 4-methyl-3-(4-methyl-2-thiazolyl)-benzoic acid.

5. A compound of claim 1 which is 5-(4-methyl-2-thiazolyl)-2-chlorobenzoic acid.

References Cited

UNITED STATES PATENTS 3,558,641  1/1971  Sarett et al. _____ 260—302 R

FOREIGN PATENTS 156,433  2/1969  France _____ 260—302 R

OTHER REFERENCES

Asinger et al.: *Chem. Abstracts*, 55:23495 (1961).
Asinger et al.: *Ann.*, 639, 133–46 (1961).

RICHARD J. GALLAGHER, Primary Examiner

U.S. Cl. X.R.

260—470, 516; 424—270